Oct. 28, 1952 W. F. BISLEY 2,615,691
HOUSEHOLD FOOD MIXER
Filed June 20, 1947 7 Sheets-Sheet 1

Inventor:
William F. Bisley
By [signature]
Atty.

Oct. 28, 1952 W. F. BISLEY 2,615,691
HOUSEHOLD FOOD MIXER

Filed June 20, 1947 7 Sheets-Sheet 2

Inventor:
William F. Bisley,
By *Watson D. Harbaugh*
Att'y.

Oct. 28, 1952 — W. F. BISLEY — 2,615,691
HOUSEHOLD FOOD MIXER
Filed June 20, 1947 — 7 Sheets-Sheet 3

Fig. 4.

Inventor:
William F. Bisley,
By Watson & Heubaugh
Atty.

Oct. 28, 1952 W. F. BISLEY 2,615,691
HOUSEHOLD FOOD MIXER
Filed June 20, 1947 7 Sheets-Sheet 6

Inventor:
William F. Bisley
By   Atty.

Oct. 28, 1952 W. F. BISLEY 2,615,691
HOUSEHOLD FOOD MIXER
Filed June 20, 1947 7 Sheets-Sheet 7

Fig. 11.

Inventor:
William F. Bisley,
By  Watson D. Harbaugh
Atty.

Patented Oct. 28, 1952

2,615,691

UNITED STATES PATENT OFFICE 2,615,691

HOUSEHOLD FOOD MIXER

William F. Bisley, Oak Park, Ill., assignor to Dormeyer Corporation, a corporation of Illinois Application June 20, 1947, Serial No. 755,995

23 Claims. (Cl. 259—84)

The present invention relates to food mixers and more particularly to food mixers having interdigitating beaters depending from a power unit overhanging a bowl.

Heretofore it has been the conventional practice to pivotally mount a power unit for movement in a plane disposed approximately vertically which leaves the power unit still over the bowl where it obstructs free access to the bowl, or is so high as to encounter a precarious condition of balance or headroom available upon a kitchen cabinet work board. Furthermore, corresponding movement of the beaters in the vertical plane eliminates any possibility of moving the power unit laterally to clear the bowl because the beaters would then drip outside of the bowl.

The present invention is characterized by a snap roll movement of the power unit through an arc which carries the power unit from above the bowl to a point essentially to one side of the bowl while still retaining relative location of the agitator over the bowl for dripping, which agitator, if it comprises two interdigitating beaters, is foreshortened as regards the total width of the beaters as they rise so that little more than the width of one of the beaters lies in a vertical projection of the bowl.

A further object of the invention is to balance the weight of the power unit in an improved relationship in which the major component of a slight and easy effort to tilt the power unit and lift the agitator is a lateral push on the power unit in a direction away from a right-handed operator using the mixer.

The invention is further characterized by a manually operable speed control ring located where it can be managed and the power unit tilted by one hand with the above mentioned lateral push, whereby the motor speed can be reduced as the beaters come out of the mixture one at a time while the other hand remains free to manage the bowl or scraping utensils.

A further object of the invention is to provide a speed control for the food mixer which can be observed and managed from both sides of the power unit.

Another object of the invention is to provide an improved control for a rotary centrifugal responsive make-and-break speed governor which divides in a balanced way at widely spaced points the frictional load of its cam adjustment for ease of operation and assembly with no danger of creep from a set position existing during operating periods of the power unit.

The invention is further characterized by an arrangement of a cooling fan upon the rotary centrifugal speed governor which is shrouded by a manually actuated ring assembly which also controls the governor.

A further object of the invention is to adjust the height of the turntable with respect to beater clearance by a finger-loose threaded bearing support which can be locked in position by a spring element without any use of tools.

A further object is to provide an improved base construction with footings of sufficient contact area and location that the food mixer can be slid easily out of way on a table top under minimum lateral effort exerted low against the side of the base without scarring the table top, particularly when the bowl is empty, yet sliding is prevented when a lateral effort is exerted upon the power unit to tilt the power unit and raise the beaters.

Another object of the invention is to provide an improved juicer arrangement whose components can be removed one at a time or all together, at will, for cleaning purposes.

Another object of the invention is to provide an improved means for releasing the beaters from their power driven or working positions when it is desirable to remove them for cleaning.

Another object of the invention is to provide a tilting mounting proximate to one end of the power unit of a household food mixer in which the over-all height of the food mixer when the beaters are raised is much less than that experienced with conventional mixers where the power unit is pivotally mounted at one end.

Another object of the invention is to provide an improved adjustment and locking device for locating the turntable and a bowl thereon at the proper height.

Other objects and advantages including ruggedness and ease of assembly and servicing will be apparent from the following description, the claims attached thereto, and the accompanying drawings, in which similar reference characters identify similar parts throughout the several views.

Referring to the drawings.

Figures 1, 2:
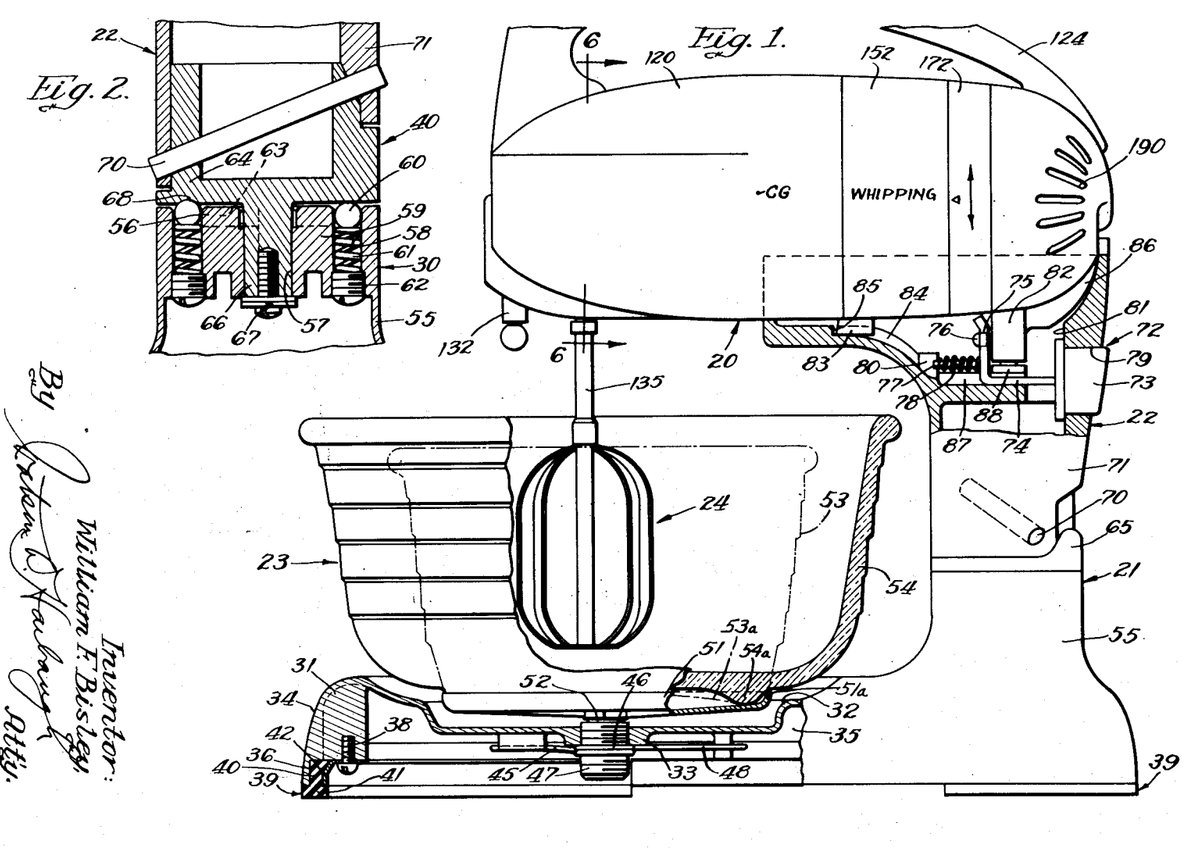
Fig. 1 is a side elevational view of an electric food mixer of the household type, partly in section, embodying the invention and in which an agitator of interdigitating beaters is shown in its working position.
Fig. 2 is an enlarged sectional view taken upon a vertical plane taken longitudinally of the pivot pin which supports the power unit and agitator which are shown in Fig. 1.
Figures 8, 9, 10:
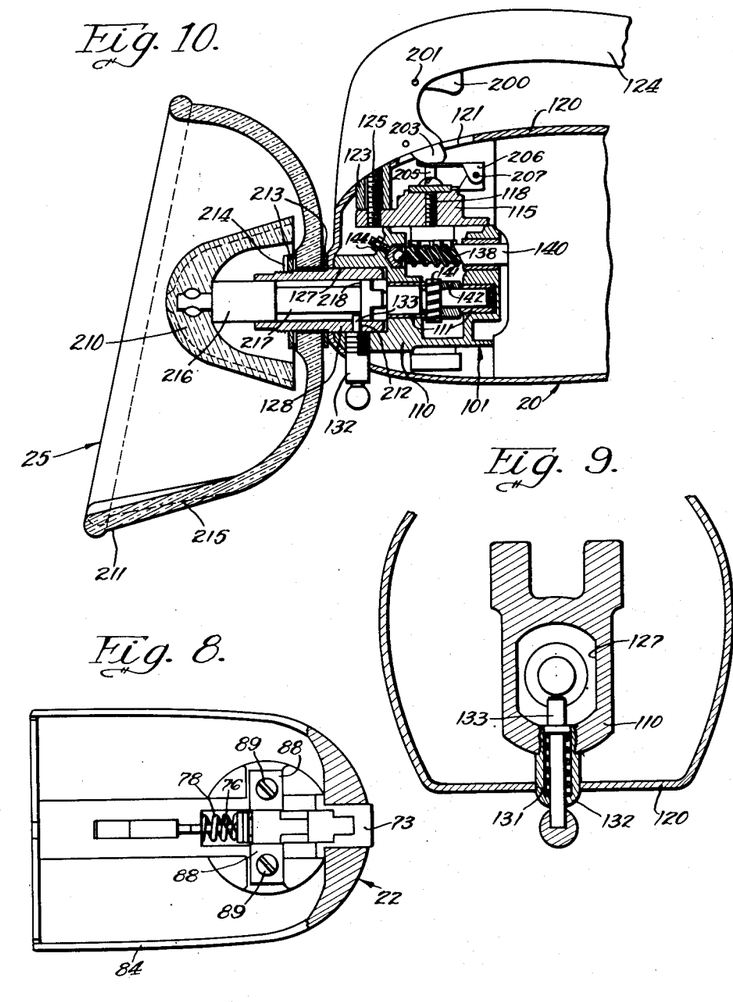
Fig. 8 is a horizontal section taken upon line 8—8 of Fig. 4.
Fig. 9 is a vertical section taken upon line 9—9 of Fig. 4.
Fig. 10 is a vertical section of the front end of the power unit with a juicer mounted in the power take-off socket.

Referring to Fig. 1, the electric food mixer embodying the invention preferably includes a power unit 20, a base 21, a standard or support construction 22, turntable and bowl construction 23, an agitator 24 and a juicer attachment 25 (Fig. 10).

*Base*

Figure 11:
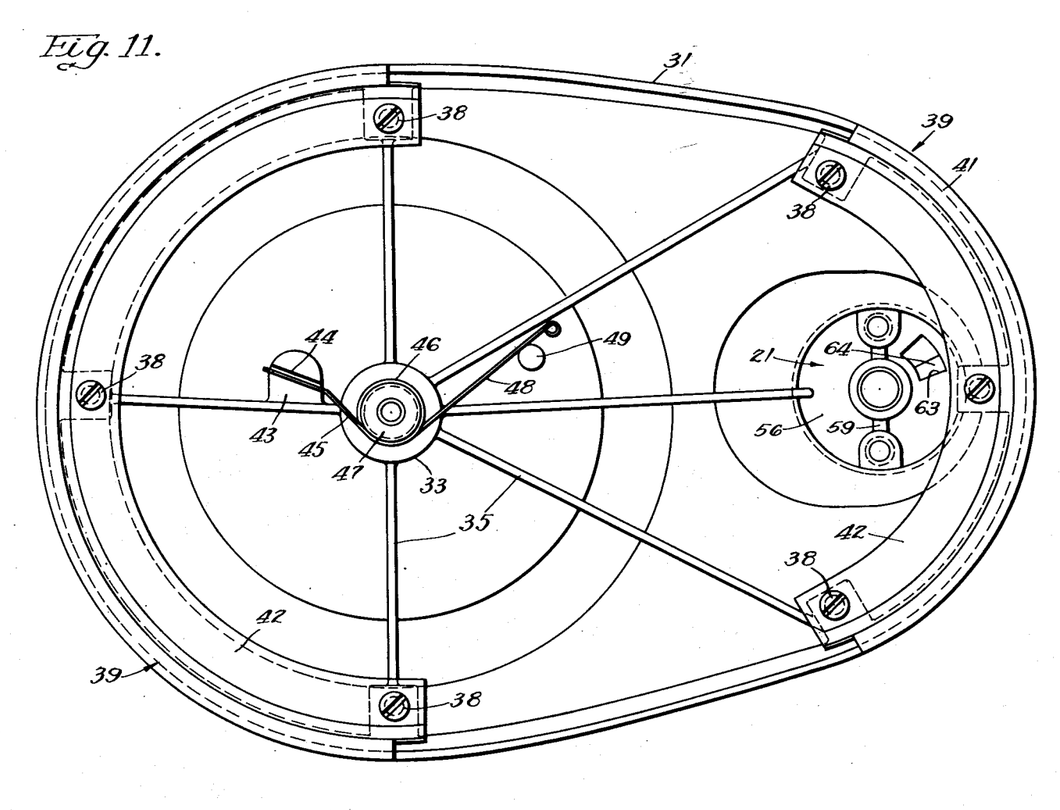
Fig. 11 is a bottom view of the base which is also shown sectionally in Fig. 1.

The base 21 comprises a preferably cast metal member 31 having a circular recess 32 in its upper face and a threaded opening at the center thereof through a boss 33 whose body portion is located on the bottom side (Fig. 11). A rounded depending border flange 34 provides a finished edge and reinforcing ribs 35 interconnect the boss 33 and flange 34. The edge of the flange 34 is formed with a right angle groove 36 on the inside and, where the ribs join, the flange lugs 37 are provided at the bottom of the groove with threaded openings to receive screws 38. Elongated rubber feet 39 are bent or formed to follow the front and back curves of the base and are conformed sectionally on one side of an upright flange portion 40 to fit into the groove 36 and cover the lower edges of the flange 34 with a footing 41. At its upper edge the flange 40 thickens and a retainer band 42 is held in place against the other side of the flange by the screws 38 to engage below the thickened portion whereby the feet 39 are held in place. The lower and table engaging face of the footing 41 is wide enough not to mar a table top and to protect the table top from contact with any metal parts. The total area of these faces is approximately five square inches and, being curved, will remain flat even when the base is slid across a table top without being lifted, there being no sharp points and the weight distribution per square foot of frictional area being low enough to prevent any scuffing. Sliding, however, is inhibited by the curved edges of the footings tending to "dig in" if there is any tendency to tilt the base induced by a lateral effort exerted upon the power unit.

Intermediate its ends, one of the ribs 35 is enlarged as at 43 and grooved as at 44 to receive one end of a wire spring 45 having an intermediate portion 46 looped concentrically with respect to the boss 33. A turntable supporting sleeve 47 is threaded into the boss 33 loosely enough to be finger adjusted to vary the height of the turntable, and the other end 48 of the spring 45 is moved in a direction tightening the loop 46 around the stud 47 until the stud is frictionally locked against turning, whereupon the spring end 48 is dropped behind and held against loosening by a lug 49 at this point. With this arrangement, a quick adjustment of the bowl level can be made without need for any tools. To do this, the spring end 48 is released, the stud turned to the correct position, and the spring end 48 returned to the control of the lug 49. The loop of the spring is preferably spiralled the same direction as the thread and the spring end 48 is on the inside or behind the loop 46. The tension of the loop 46 clamps the stud and snubs it against turning. Any tendency to turn develops a further tightening effort from either one or the other of the ends of the spring. Thus constructed, the spring also retains its position against inadvertent dislodgment.

A turntable 51 having a spindle 52 removable and rotatably mounted in the sleeve 47, receives any one of a number of bowls therein defined by the upturned flange 51a for rotation about a fixed axis. Two bowls in the single cavity are shown—a small bowl 53 and a large bowl 54 both having case flanges 53a and 54a respectively. The recess 32 is contoured to follow the outline of the large bowl and the turntable, and to conceal from view the sleeve 47 and spindle 52 whereby it provides an artistic arrangement and a guide for sliding the bowl into and out of place on the turntable. Both bowls may be rotated about the same axis but in event it is desired to inhibit rotation, either bowl can be shifted from the turntable so that the bottom also engages the base on one side at the margin of the recess without tipping the bowl more than a few degrees, the bowl being tipped inwardly in any event in a way accommodating the agitator.

In event free rotation of the bowl is desired by hand only, the turntable can be removed and the contour of the recess 32 will support either bowl for manual rotation about a fixed axis.

Removal of the turntable lowers the bowl approximately an eighth of an inch, the clearance provided by the turntable adjustment being preferably approximately this amount so that with this clearance the bowl is also steadied by the base against upsetting if the bowl is inadvertently knocked downwardly at the edge.

*Shift of agitator in bowl*

At the rear of the base and to one side of the recess the base is provided with a pedestal 55 (Fig. 2) upon which is mounted the power unit tilting and supporting mechanism 22. The top of the pedestal is a heavy wall 56 having a transverse rib 59 with a central aperture 57 therethrough and two smaller ones 58 on opposite sides thereof. The smaller apertures receive detent balls 60 pressed upwardly by compression springs 61 that are held in place by screws 62 threaded into the bottom of the apertures.

An arcuate aperture 63 (Fig. 11) is also provided in the wall 56 whose radially disposed walls serve as stops for a lug 64 upon the support member 65. This support assembly 21 follows the peripheral contour of the pedestal 55 and rests flat on the top thereof as held in position by a stud 66 which is journalled in the aperture 57. The stud is held in place by a screw and washer assembly 67 threaded into the bottom of the stud.

Two recesses 68 spaced from each other a different angular distance than the detents are alternately engaged by the respective detents 60 to locate the member 65 in either one of two alternate positions, one of which is coincident with the limitation imposed by the stop 64 to keep the axes of the beaters to one side of the turntable axes, and the other one of which is short of the alternate stop limit to locate the beaters near the side of the large bowl with freedom to move the beaters farther and against the side of the large bowl if it is desired during mixing operations.

Tilt of power unit and agitator

The upper part of the support member 65 is made hollow for the sake of lightness and the approximately circular wall defining same is apertured to receive a pivot pin 70 which is preferably disposed at an angle of 22½° to the horizontal and from 22½° to 35° to a vertical plane disposed transversely to a line running through the axes of the turntable and the stud 66 on the pedestal.

A supported element 71 of the tilt mechanism 22 is mounted upon the pin 70 to carry the power unit 20 for tilting movement about the pin 70 to raise and lower the beaters 24, and for lateral shifting movement of the beaters about the vertical axis of the stud 66 as controlled by limits of the stop 64 and by the positioning action of the detents 60.

The tilting and shifting movements, in operation, and the arrangements of the parts are such that the beaters may be moved during mixing operation horizontally between the limits described. These limits can be on either the one side of the bowl axis or upon the other side, depending upon how the mixer is constructed for right or left-hand operation. Moreover the incline of the pin 70 can be in either direction or at right angles to same, depending upon the desires of the manufacturer and user, and when tilted the beater axis constitutes one of two skewed lines rotated about the other, namely, about the pivot pin, to define a path of movement geometrically identified as a hyperboloid of one sheet.

In the embodiment illustrated, as viewed in Fig. 1, the mixer is constructed for a predominately right-handed public. As viewed, the limits are located beyond the turntable axis and the high end of the pivot pin is away from the viewer. Considering then the axis of the pin as a projected line, the pin is so inclined and angled that that point on the axis which lies nearest to the beaters is preferably spaced from the support on the far side of the mixer a substantial distance. With this arrangement, the rear end of the power unit 20 can be pushed by the user's hand and it will fall away over said tilt axis to tilt and raise the beaters and move them towards the user while the power unit moves away from over the bowl to provide substantially complete vertical access to the bowl. Movement towards the user of the beaters keeps them over the bowl so that they will drip back into the bowl, yet the composite width of the beaters measured horizontally is narrowed or foreshortened appreciably for restricting their interference with access to the bowl. The preferred angle to which the beaters are tilted is 33° to the horizontal at the upper limit as defined by the ends of the beaters.

If it were desired to have the shift limits of the beaters on the near side of the bowl as viewed in Fig. 1, the mirror image of the construction shown would be used and a mirror action of the above movements would follow in which the tilt pin is arranged with its high point on the near side of the mixer.

This tilt movement is characterized as a snap roll and can be accomplished in varying degree from the preferred relationship as long as that point on the axis defined by the tilt pin 70 which is nearest to the agitator is spaced from the support element 64. This point can be determined by a line drawn perpendicular to the axis from the agitator.

Thus the effective tilting action for the agitator may be located in space at any point remote from the standard where it would be impossible or inconvenient to locate the pin 70 physically. This effective point can be below the level of the bottom of the agitator if the agitator is to be moved in the same direction as the power unit when tilted. It can be on a level halfway up the beater if the agitator is to move substantially straight up, or it can be above the halfway point on the agitator if the agitator is to move in the direction opposite to direction of tilt of the power unit.

Furthermore, by inclining or angling the pin 70, or by doing both to the pin, the axis defined thereby can pass at one point close enough under the center of gravity of the power unit (identified generally at CG) that the power unit passes over it when tilted so that the power unit can be tilted by a movement or effort whose major component is horizontal while the axis at another point passes a point sufficiently remote from the agitator that that portion of the power unit disposed above the bowl is moved off to one side of the bowl when the agitator is raised enough to permit lateral removal of the bowl.

Figure 3:
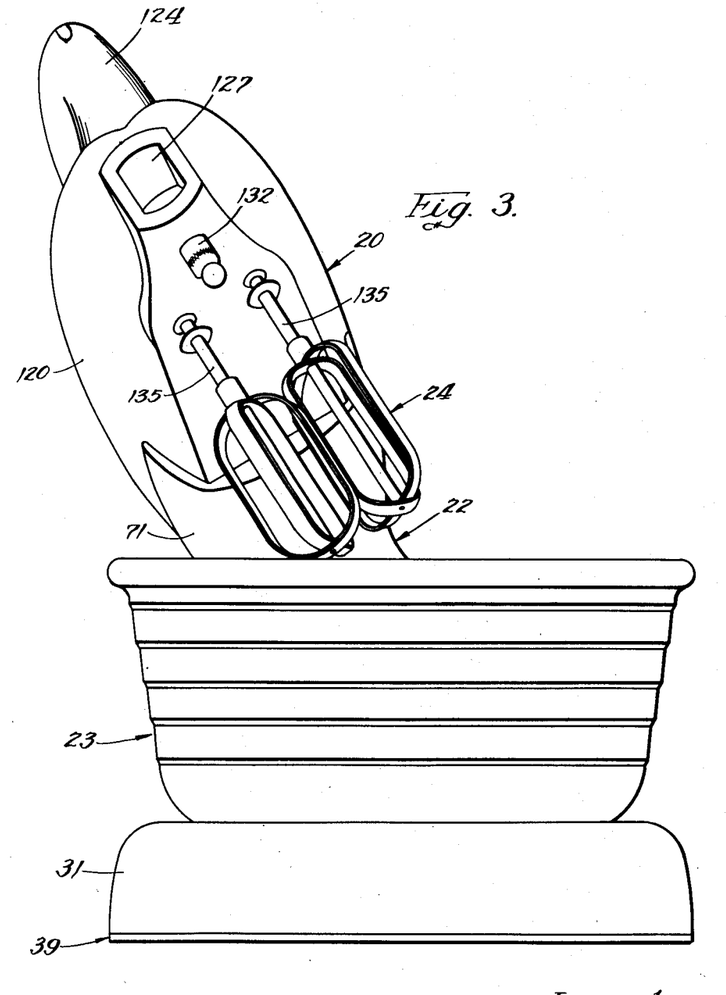
Fig. 3 is an end elevation of the food mixer shown in Fig. 1 when the power unit is in tilted position to raise the agitator from the bowl showing how the power unit is rolled away from over the bowl for access, yet the beaters are where they can drip into the bowl and be easily detached.

For instance, with the embodiment shown, the axis passes outside but close to the top of the bowl where it is approximately equidistant from the center of the agitator and the center of the power unit above the agitator, and where the center of gravity of the power unit passes over it at about two-thirds of the full tilt movement when the beaters are being raised from the far side of the bowl as viewed in Fig. 1 or the left side of the bowl as viewed in Fig. 3.

The height of the pivot pin 70 with respect to the top of the bowl is significant in this connection because if it is desired as in the preferred form of the invention to have the power unit tiltable in that direction from the center of the bowl upon which the beaters operate, the closest point on the axis to the beaters should be at or above a horizontal plane which is equidistant from the nearest portion of the agitator and the inner side of the upper lip of the bowl. Preferably above this plane since some movement towards the center of the bowl is desirable to assure that the beaters will drain into the small bowl even if the power unit is shifted laterally as for a large bowl. In this position the beaters drip back into the bowl and pass in and out of the bowl with wide clearance of the bowl's edge. Thus additional freedom of design is afforded to accommodate balance and different weight distributions of power units of household mixers when the axes of the interdigitating beaters never pass the axis of bowl rotation. The space on the other side of the bowl permits a wide sweep of the beaters if desired.

On the other hand, where the closest point to the tilt pin 70 axis is below the said plane, the beaters in tilting move through a wider arc in the same direction as the power unit and in their raised position have passed over the center of the bowl to a point beyond the center of the bowl from their working position. This is true regardless of which way the power unit may be arranged to tilt, i. e., whether for left or right-hand use. Consequently, it will be seen that the disposing of the pivot pin at an incline or angle, or both, where that point on the axis which is nearest to the beater is spaced from the support, makes it possible to provide a convenience of handling and a clearance of the bowl and other results not heretofore present in household food mixers.

The tilt pin can be located at any height as long as the above principles are observed in connection with the end result desired regarding the tilt position of the power unit.

Removability of power unit

The power unit 20 is removably secured to the upper or supported member 71 by means of a latch mechanism 72 which comprises a button 73 carrying a slide latch bar 74 apertured as at 75 to telescope over a tapering lug 76 as spring pressed into normal latching relation by a compression spring 77. The compression spring is disposed on a pin 78 that is received in a guide slot 80 on the member 71. The latch mechanism 72 is disposed in the hollow portion 81 of the member 71 whose marginal edge fare into and follow the contour of the power unit. The latch mechanism is located to cooperated with a boss 82 on the bottom of the power unit which supports the lug 76 as well as a stop 83 received in a guide slot 84 where it rests against a shoulder 85. The back of the boss 82 is rounded upwardly as at 86 to nest into the hollow 81 so that the power unit is positioned between the back of the member 71 and the shoulder 85 where the latch is operable for its purpose.

The bar 74 slides in a guideway 87 provided for that purpose in the floor of the hollow 81 and the latch is assembled by inserting first the button 73 into the opening 79, lowering the bar 74 into the slideway 87, compressing the spring 77 to slip the pin 78 into place in the slot 80. Thereafter a retaining bar 88 (Fig. 4) is fastened into place by screws 89 (Fig. 8) to hold the latch in place. Inward pressure upon the button 73 releases or receives with a latching action the pin 76 in the hole 75.

The latching relationship is one which holds the power unit on against lateral as well as endwise movement so that the tilt position in nowise runs the danger of the power unit coming loose and the engagement can be easily made because of the relative contours being visual as well as physical guiding factors.

Power unit

Figure 4:
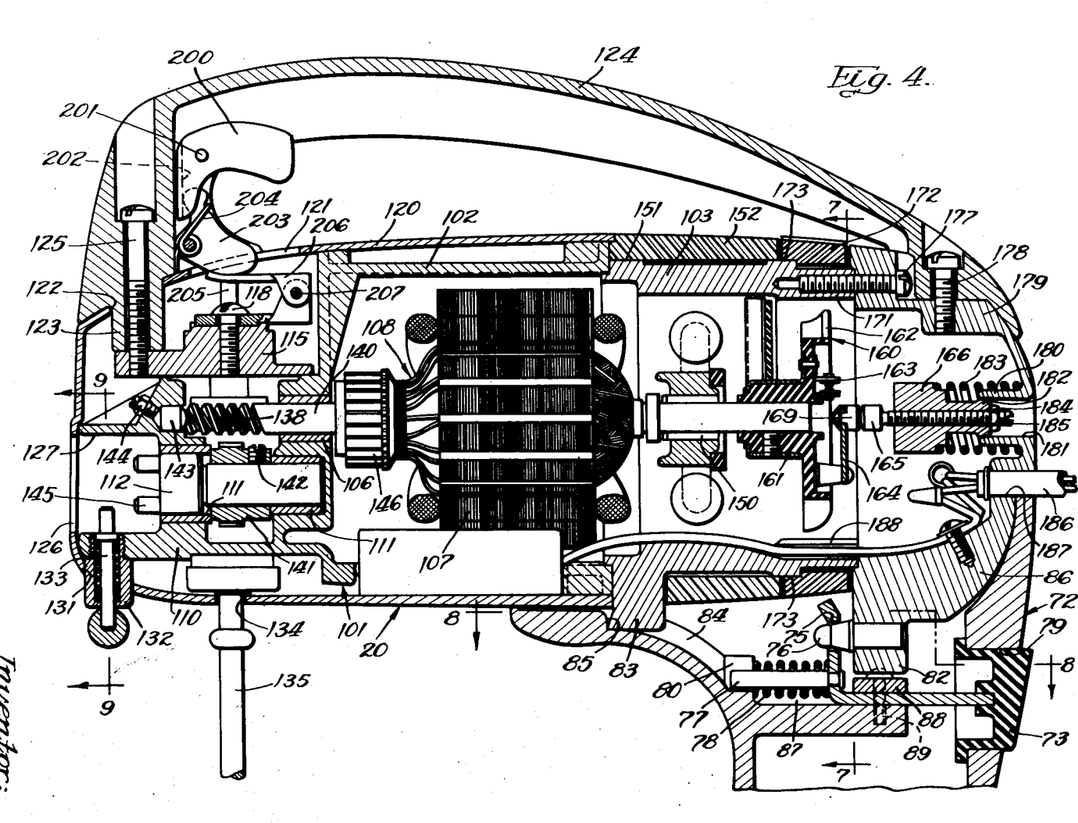
Fig. 4 is an enlarged vertical section taken on a plane passing through the axis of the motor drive showing the construction and arrangement of the elements of the power unit.
Figure 5:
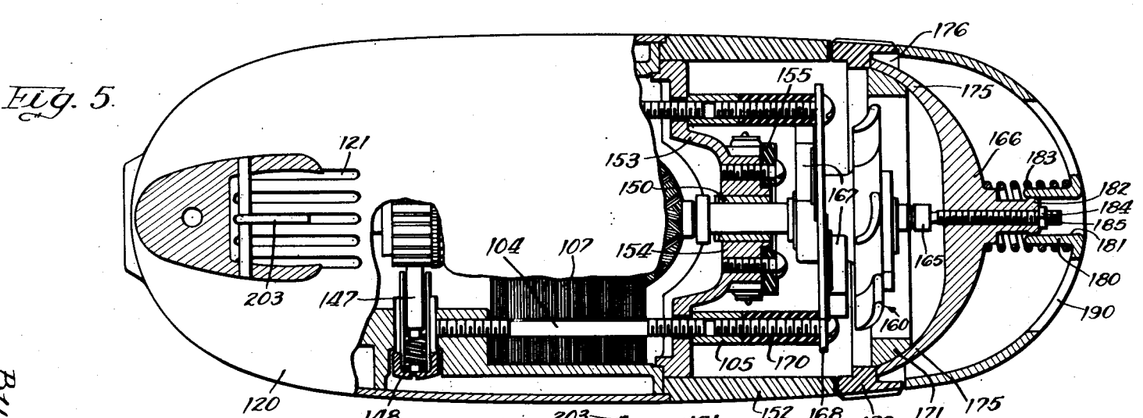
Fig. 5 is a top plan view partly in medial section of the power unit shown in Fig. 4.
Figure 6:
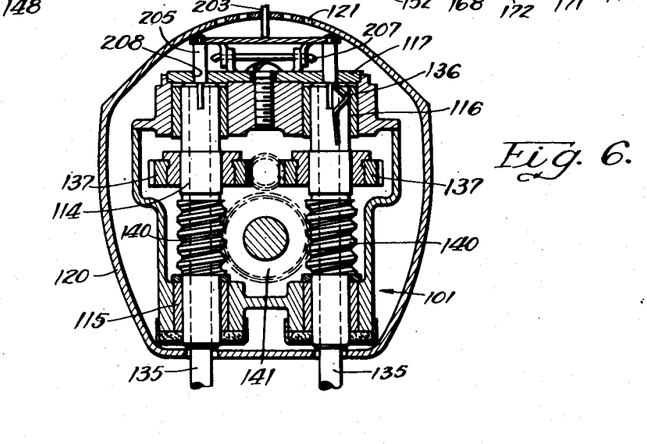
Fig. 6 is a vertical transverse section taken on the plane of the beater axes taken as upon line 6—6 of Fig. 1.

Referring now to Figs. 4 and 5, the framework of the power unit 20 comprises a rough inner casing 101 having front and rear sections 102 and 103, respectively, held together by studs 104 and elongated units 105. The front section is bored and reamed concentrically to receive the front armature bearing 106 and the stator 107 of a series wound fractional horsepower electric motor 108. The transmission housing 110 is formed preferably integral with the front section and it is bored and reamed horizontally to receive bearings 111 for a low speed power take-off shaft 112 and vertically for horizontally spaced lower bearings 113 to journal cylindrical beater shafts 114 (Fig. 6). A cap 115 for the transmission housing is bored and reamed to receive upper bearings 116 for the beater shafts 114 and the upper ends of the upper bearings are covered by an insert 117 held in place by screw 118.

An outer finishing shell 120 is received over the front section which shell is apertured on top as at 121 to provide an outlet opening; as at 122 to receive a boss 123 on the handle 124 as held in place by a screw 125; as at 126 to provide access to the power take-off socket 127 which is a cylindrical recess flattened on the sides thereof to receive the shank 128 of a power attachment such as a juicer 130 shown in Fig. 10; as at 131 to receive the power attachment latch carrier 132 having a latch pin 133 therein; and as at 134 to admit the upper ends of beater shafts 135 therein.

The upper ends of the cylindrical shafts 114 are cross-kerfed to receive radial extending depressible springs 136 (Fig. 6) to drive the beaters 60 from the shafts and the shafts in turn carry worm wheels 137 located on opposite sides and in stepped and meshed relationship with a worm gear 138 cut into the end of the armature shaft 140.

Below the worm wheels 137, worm gears 140 are cut into the beater shafts to drive the worm wheel 141 keyed to the power shaft 112 by a setscrew 142. End thrust resulting from the drive of the armature worm gear 138 is borne by an end thrust slug 143 adjusted by a lock screw 144. Drive is transmitted to the juicer attachment through a tenon and groove engagement 145.

Upon opposite sides of the commutator 146 of the armature, brush mountings 147 are provided as shown in Fig. 5 and the caps 148 are recessed so that the finish shell 120 conceals them.

The rear section 103 carries the rear inboard motor bearing 150 and the lug 83 (Fig. 1). The outer surface 151 of the section 103 is turned down to receive rigidly a decorative plastic band 152 flush with the outer marginal edge of the shell 120 to cover up openings through the side of the rear section 103, which openings are provided for inspection and access when the band is removed.

The bearing 150 is mounted in a transverse portion 153 (Fig. 5) which is enlarged as at 154 to receive it and the enlargement on its rear face is shouldered to support a plate 155 made of insulating material which carries electrical components of the motor circuit in "snap-in" relationship such as the condenser and the resistance employed conventionally in a centrifugal circuit interrupter speed governor 160 whose rotating part and its function are more specifically described in Behar Patent No. 2,262,912, reference to which is hereby made. Briefly, the rotating part includes a plastic casting having two axially spaced collector rings 161 on its hub, fan blades 162 on its periphery, and centrifugal and adjustable make-and-break contacts 163 on its end face with a lever 164 to determine the speed at which the contacts separate. An insulating button is carried by the lever for rotation at the axis of armature rotation where it can be actuated with minimum friction by a manually moved piece 165 carried on a yoke 166.

Brushes 167 contact the collector rings 161 as carried by an insulating plate 168 held in place by bolts and spacer assemblies 170 secured to the nuts 105.

Figure 7:
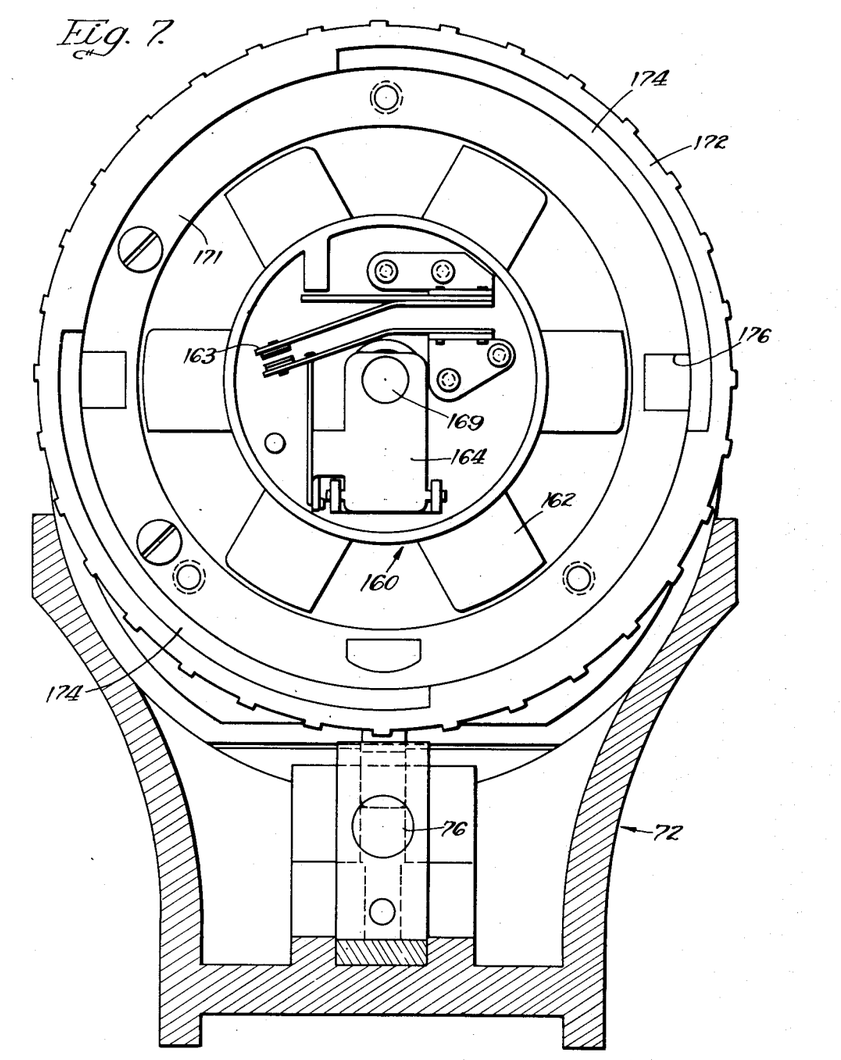
Fig. 7 is a vertical section taken upon line 7—7 of Fig. 4.

Radially around the fan 162 the section 103 has a continuous circular flange 171 which closely approaches the periphery of the blades to provide a shroud or baffle for the fan. On the outer surface of this flange, an adjustment ring 172 is journalled as at 173 for rotation between limits of approximately 90°. On its rear surface the ring as viewed in Fig. 7 is provided with two identical cam surfaces 174 molded integrally therewith and the ends 175 of the yoke 166 (Fig. 5) slide on these cam surfaces as the ring is rotated. The ends of the yoke are held against turning by guideways 176 cast in the rear of the flange 171.

A finishing cap 179 rigidly secured to the rear end of the flange 171 by screws 177 carries the rear end of the handle 124 by screw 178 and a central hub member 180 bored as at 181 receives in sliding and centering relationship a head 182 on the yoke so that the two ends and the sliding head provide a three point suspension for the yoke to move forwardly and rearwardly as the ring 172 is rotated, the yoke being urged to contact the cam surfaces by a compression spring 183 encircling the boss 180 and contacting the yoke 166.

Movement of the yoke is transmitted to the governor lever 164 by a round-headed screw engaging the insulating button 169 and threaded through the yoke head 182 where it receives a lock nut 184. The head 182 is kerfed as at 185 to provide a zeroing adjustment of the governor assembly once the slug 143 is set at the front end of the armature shaft.

Electrical leads 186 are brought into the power unit through an opening 187 at the rear of the cap 179 and are carried forwardly to the electrical components through an opening 188 in the flange 171.

Air for cooling the motor is drawn through openings 190 in the rigid cap 171, as moved by the fan 162, and is exhausted upwardly through openings 121 under the handle 124.

With this arrangement the speed of the motor is infinitely varied by long cams of gradual inclines which divide the frictional load and the take-up spring tension load imposed on the system between them so that the ring is operable by hand smoothly and easily with no danger of it slipping from a set position while the motor is running. Moreover, the ring can be operated from either side of the mixer and also while the power unit is being tilted.

*Beater release*

The preferred embodiment includes a device for loosening the beaters preparatory to their removal after a mixing operation has been completed and their cleaning is desired. This construction comprises a trigger-like lever 200 pivoted upon the handle 124 at its front end on a pin 201. This trigger can be made of a folded stamping having a groove 202 at its lower end to receive the primary arm of a second lever 203 which is spring pressed against it by a coil spring 204. The secondary arm of the lever 203 is flattened to pass through one of the air outlet openings 121 to exert a downward drive when the upper lever is squeezed by a user's index finger.

Utilization of this downward drive is made to loosen the shafts by thrust pins 205 driven and carried by a holder 206 which is pivoted to the closure 117 as at 207. The lower ends of the pins are disposed in openings 208 coaxially with the beater shafts 114 and rest on top of the shafts 135 when the beaters are in place. Downward movement of the lever 203 forces the holder 206 downwardly to drive the pins through the openings 208 and displace the beaters enough that they can be withdrawn quite easily from there by hand.

The construction provided is one in which the cover 120 can be slipped over the front section after the transmission has been assembled and the lever 203 dropped into working position when the handle is attached.

If it is desired to remove the beaters when tilting the power unit, the handle 124 may be seized and the trigger 200 squeezed as the unit is raised. Once the power unit is in its snap roll tilted position, the beaters can be removed quite easily without again entering the mix in the bowl as they are withdrawn. Furthermore, the handle is always in position for ready use in managing the power unit if it is desired to remove the power unit from the base.

*Juicer*

An improved juicer construction 25 is provided in which the latch pin 133 can be withdrawn to release the reamer 210 for separate withdrawal without releasing the bowl 211 and its supporting hub 128, or both can be released at the same time by full retraction of the pin 133. This construction is such that the hub 128 is apertured at only one point 212 to receive the pin and the ceramic or plastic bowl 211 is secured on the hub in only one relative position by compression of its body between washers 213 and a nut 214 carried by the hub. With this construction the juicer can be attached in only the correct position in which the long side and its drain-like construction 215 is disposed downwardly. The shaft 216 is grooved as at 217 to provide a shoulder 218 just inwardly of the opening 212 and the latch pin 133 is long enough to engage this shoulder at its top position. Thus the juicer attachment can be assembled on or taken off of the power unit in separate parts or as a unit.

Consequently, having thus described the invention it will be apparent to those skilled in the art how the objects and results set forth are accomplished and how various changes and modifications can be made without departing from the spirit of the invention, the scope of which is commensurate with the appended claims.

What is claimed is:

1. In a food mixer of the class described the combination of a housing, a driven shaft journalled in the housing and comprising a sleeve, said sleeve having an opening at one end to receive a beater shaft in driven relationship, and an opening at the other end exposing the upper end of a beater shaft received in said sleeve, a lever, and thrust means driven by said lever for engaging said exposed end of the beater shaft and movable by the lever in a direction generally axially of the sleeve to dislodge the shaft.

2. In a food mixer of the class described the combination of a housing, a pair of sleeves journalled in the housing parallel with each other, each of said sleeves having an opening at one end to receive a beater shaft and an opening at the other end exposing the upper end of a beater shaft inserted into said sleeve, a lever, thrust elements for engaging the exposed ends of the beater shafts, and means driven by said lever for driving said elements simultaneously in a direction generally axially of the sleeves to displace said beaters.

3. A pivotal mounting for a household food mixer agitator including a supporting member, a supported member, and a pivot pin interconnecting the two members and disposed at an angle of 22½° from the horizontal, the axis of said pin being disposed to pass closer to the agitator on one side of the members than on the other side.

4. A pivotal mounting for a household food mixer agitator including an elongated supporting member, a supported member, and a pivot pin interconnecting the two members and disposed at an angle of 22½° from the horizontal and from 22½° to 35° to a vertical plane disposed transversely to major dimension of said supporting member.

5. A household food mixer having a rotary agitator and a base having a recess in its upper face below said agitator, a turntable rotatably mounted in said recess and having a single annular seat thereon to receive bowls of different sizes having annular rings, which rings have an identical dimension on their bases to mate with said seat, the larger of said bowl being rounded outwardly and upwardly from said ring, said bowls being rotated by the action of the agitator on the contents of the bowl when the agitator and bowl are disposed in predetermined relationship and said recess closely following the contour of said turntable and said rounded portion of the bowl adjacent said ring, whereby said turntable may be removed and the ring received in said recess to center the bowl, and said rounded contour supports the bowl for free rotation by hand.

6. In a household food mixer the combination of a power unit driving an agitator comprising a pair of interdigitating beaters revolving about horizontally spaced vertical axes in their working position, defining a vertical plane, a large and small mixing bowl, means for supporting the bowls interchangeably for rotation about a predetermined axis, means providing relative shifting between the agitator and said supporting means for locating the agitator in close proximity to one side of either bowl, and means for tilting the power unit to raise the agitator from its working position including a pivot pin located at a point on a line perpendicular to said plane between said axis and whose axis passes closest to the agitator at a point spaced from the pin and outside said one side of the bowl, said pin axis intersecting at an acute angle the vertical plane defined by said predetermined bowl axis and the pin itself and the agitator transcribing an arc having a horizontal component of movement away from said side of bowl which is proximate thereto while the power unit is moved laterally from directly over the bowl.

7. A base for a food mixer comprising a body portion with a depending flange extending across the front and around to the sides of the base and defining an included right angle groove, elongated rubber feet extending the length and following the contour of said flange and having a flange portion with upwardly diverging sides mating upon one side with said groove and a foot portion covering the lower edge of said depending flange, and band means engaging the other side of said flange portion and secured to said base for holding said flange portion in place.

8. A pivotal mounting for a household food mixer agitator including a supporting member, a supported member for carrying said agitator, and a pin interconnecting the two members for relative pivotal movement, said pin being so constructed and arranged that the axis thereof is inclined to the horizontal and passes closest to said agitator at a point spaced from said members.

9. A pivotal mounting for a household food mixer agitator including a supporting member having a bowl thereon, a supported member, and a pin interconnecting the two members for relative pivotal movement between the members, said supported member carrying said agitator at a working position in said bowl, said pin being located at one side of the bowl and the axis thereof passing close to the upper edge of the bowl at another side thereof and at a point spaced from said members.

10. A pivotal mounting for a household food mixer agitator comprising a supporting member, a supported member including an elongated power unit to carry and drive the agitator, and a pivot pin interconnecting the two members and so disposed at an acute angle to a vertical plane which includes the major dimension of the power unit that the axis of said pin is disposed to pass closer to a vertical projection of the center of gravity of said power unit and closer to the agitator on one side of the members than on the other side.

11. A tilting mechanism for a power unit and an agitator supported thereby comprising a supporting member for receiving a bowl, a supported member for carrying the power unit and agitator, and means for pivotally mounting said supported member for relative movement about an axis whose closest points to the agitator and to the bowl are spaced from said members at levels above the bottom of the bowl, the power unit being moved laterally from over the bowl in its raised position.

12. A tilting mechanism for a power unit and an agitator supported thereby including a supporting member for receiving a bowl, a supported member including the power unit and agitator, and means for pivotally mounting said supported member for relative movement about an axis whose closest point to the bowl is spaced laterally from vertical projection of the bowl and from said members at a point above the bottom of the bowl, the power unit being moved laterally from over the bowl in its tilted position and the center of gravity of the power unit passing over said axis as it nears the end of its movement to its tilted position.

13. In a food mixer, a bowl, a support at one side of the bowl, a power unit upon the support receiving a pair of depending interdigitating beaters revolvable about parallel axes in the bowl to one side of the center of the bowl, said support including a pivot pin located below the power unit and whose axis is disposed at an angle to a plane including said beater axes where it passes outside of but close beside the bowl and the nearest point on said axis to the bowl is spaced from said pin.

14. A pivotal mounting for a household food mixer having interdigitating beaters defining a horizontal working area and rotatable about vertical axes defining a vertical plane when disposed in their working position, a supporting member, a supported member for carrying said beaters, and a pin interconnecting the two members for relative pivotal movement, said pin being located on an axis which intersects said plane at all working positions of the beater and at an acute angle at a point spaced from a vertical projection of the working area of said beaters.

15. A pivotal mounting for a household food mixer having interdigitating beaters rotatable about vertical axes defining a vertical plane when disposed in their working position, a supporting member, a supported member for carrying said beaters including a power unit having an axis of rotation disposed at right angles to said plane, and a pin interconnecting the two members for relative pivotal movement, said pin being located on an axis disposed in a constant position with respect to the beaters in all beater positions, which axis intersects said plane at an acute angle at a point spaced from said members and which is at an acute angle to a vertical plane which includes said axis of rotation of the power unit.

16. In a household food mixer having a power driven depending agitator rotatable about a vertical axis and a vertical support therefor said vertical axis and support defining a vertical plane when the agitator is in working position, a pivotal connection between said agitator and vertical support including a pin defining an axis disposed at an acute and constant angle to said plane with the point on the axis closest to the agitator being spaced from said pin and said vertical axis describing a portion of a hyperboloid of one sheet when the agitator is tilted.

17. A pivotal mounting for a household food mixer agitator including a vertical supporting member, means for pivotally mounting the supporting member for shifting same about a vertical axis, a supported member shifted with the supporting member and carrying said agitator in a vertical position when same is disposed in its working position, said agitator vertical axis and said supporting member defining a vertical plane when said agitator is in its working position, pin means connecting the two members in said plane for relative pivotal movement and defining an axis of pivotal movement disposed at an acute angle constant with respect to said plane, said axis being nearest to the agitator at a point spaced from said pin but to one side of directly above said agitator when the agitator is in its working position.

18. In a food mixer, an ejector for a food agitator having a supporting shaft comprising a manually operable lever, means for receiving said shaft in supported drive relationship, and means actuated by said lever including a thrust element disposed in alignment with the agitator shaft at the end thereof remote from the agitator, said thrust element having a throw controlled by said lever within which to engage and displace the shaft of the agitator from its supported drive relationship in a direction axially thereof when the lever is operated.

19. In combination a food mixer base having a threaded opening, a threaded turntable support received in said opening and having a portion thereof extending below the base, a wire spring having two extending end portions and an intermediate looped portion, said end portions being disposed at one side of the looped portion, and the looped portion being disposed around the extended portion of the turntable support said loop being of a slightly greater diameter than that of the extended portion when in its resting position, means on said base for supporting one end of the spring with respect to the extended portion, and an element on said base defining a stop for the other end of the spring to which said other end is moved when flexing the looped portion to seize against the extended portion of the turntable support.

20. In combination a food mixer base having a threaded opening, a threaded turntable support received in said opening loosely enough to be finger adjusted to vary the height of the turntable and having a portion thereof extending below the base, a wire spring having a looped intermediate portion and two end portions extending therefrom, said loop portion being disposed around the extended portion of the turntable support and being of a slightly greater diameter than that of the extended portion when in resting position, means on said base for supporting one end of the spring at a point spaced from the extended portion, and an element spaced from the extended portion defining a stop for the other end of the spring to which said other end is moved to flex the looped portion tightly against the extended portion of the turntable support.

21. In a household food mixer having a bowl supporting member locating the bowl in a predetermined position, a tilting mechanism for a power unit and an agitator supported thereby comprising a supported member for carrying the power unit and agitator, and means for pivotally mounting said supported member including a tilt member defining an axis of relative rotation, said axis being disposed to pass outside but close to the top of the bowl where it is approximately equidistant from the center of the agitator and the center of the power unit above the agitator, the power unit being moved laterally from over the bowl in its raised position.

22. A pivotal mounting for a household food mixer agitator including a supporting member, means for pivotally mounting the supporting member for shift movement about a vertical axis, a supported member, including a horizontally disposed motor for carrying said agitator, and a pin interconnecting the two members for relative pivotal movement, said pin being so constructed and arranged that the axis thereof is inclined to a vertical plane, which includes the motor axis and passes closest to said agitator at a point spaced from said members.

23. A household food mixer having a rotary agitator and a base having a recess in its upper face below said agitator, a turntable rotatably mounted in said recess with the upper edge thereof disposed approximately at the level of the upper face of the base adjacent thereto and having a singular seat thereon to receive bowls of different sizes which have central base portions of identical dimensions to mate interchangeably with said seat, the larger of said bowls having a base extending radially outwardly from said central portion and rounded upwardly, said bowls when mounted on said turntable being rotated by said agitator while acting upon the contents of said bowls, said recess closely following the contour of said turntable and central base portion and the radially outwardly extending base portion of the large bowl adjacent to said central base portion, whereby said turntable may be removed and said base portion received in said recess to center the bowl and said radially extending base portion in weight bearing relationship for free rotation by hand.

WILLIAM F. BISLEY.

REFERENCES CITED

The following references are of record in the file of this patent:

UNITED STATES PATENTS

| Number | Name | Date |
|---|---|---|
| 295,665 | Broomall et al. | June 20, 1882 |
| 377,003 | Young | Jan. 24, 1888 |
| 920,374 | McDonald | May 4, 1909 |
| 988,911 | Terry | Apr. 4, 1911 |
| 2,031,770 | Gilbert et al. | Feb. 25, 1936 |
| 2,048,455 | Knapp | July 21, 1936 |
| 2,113,916 | Goldblatt et al. | Apr. 12, 1938 |
| 2,131,290 | Kochner et al. | Sept. 27, 1938 |
| 2,192,843 | Bean | Mar. 5, 1940 |
| 2,262,912 | Behar | Nov. 18, 1941 |
| 2,275,878 | Allenby | Mar. 10, 1942 |
| 2,371,898 | Knauer | Mar. 20, 1945 |